(12) United States Patent
Uebele et al.

(10) Patent No.: US 10,590,804 B2
(45) Date of Patent: Mar. 17, 2020

(54) GAS TURBINE ALIGNMENT SYSTEMS AND METHODS

(71) Applicant: General Electric Company, Schenectady, NY (US)

(72) Inventors: Todd Richard Uebele, Houston, TX (US); Alexander Noel Colom, Houston, TX (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 15/445,554

(22) Filed: Feb. 28, 2017

(65) Prior Publication Data

US 2018/0245483 A1    Aug. 30, 2018

(51) Int. Cl.
| F01D 25/28 | (2006.01) |
| F02C 7/20 | (2006.01) |
| B23P 19/10 | (2006.01) |
| B66F 3/35 | (2006.01) |

(52) U.S. Cl.
CPC ............... *F01D 25/28* (2013.01); *B66F 3/35* (2013.01); *F02C 7/20* (2013.01); *B23P 19/10* (2013.01); *B23P 19/105* (2013.01); *F01D 25/285* (2013.01); *F05D 2230/644* (2013.01); *F05D 2270/65* (2013.01)

(58) Field of Classification Search
CPC ..... B23P 19/10; B23P 19/105; B23P 2700/13; F05D 2230/64; F05D 2230/644; F01D 25/28; F01D 25/285; F02C 7/20; F15B 1/027; F15B 1/04
See application file for complete search history.

(56) References Cited

U.S. PATENT DOCUMENTS

| 4,507,914 A | 4/1985 | Rice |
| 4,550,562 A | 11/1985 | Rice |
| 4,571,935 A | 2/1986 | Rice |
| 5,050,668 A | 9/1991 | Peterson et al. |
| 5,150,569 A | 9/1992 | Chapman |
| 5,161,369 A | 11/1992 | Williams |
| 5,316,202 A | 5/1994 | Murray et al. |
| 6,453,545 B1 | 9/2002 | Hatley et al. |
| 6,462,455 B2 | 10/2002 | Hatley et al. |
| 8,011,182 B2 | 9/2011 | Hastings |
| 8,117,842 B2 | 2/2012 | McBride et al. |
| 8,581,432 B2 | 11/2013 | Rohrer |
| 2002/0067083 A1 | 6/2002 | Hatley et al. |
| 2006/0083612 A1 | 4/2006 | Roney et al. |

FOREIGN PATENT DOCUMENTS

| EP | 0497472 A1 | 8/1992 | |
| WO | WO-2016171695 A1 * | 10/2016 | ........... A47C 27/061 |

* cited by examiner

*Primary Examiner* — Christopher J Besler
(74) *Attorney, Agent, or Firm* — Fletcher Yoder, P.C.

(57) ABSTRACT

A system includes an alignment system. The alignment system includes a first bladder configured to be positioned under a first component of a first gas turbine system. The alignment system further includes a first valve configured to adjust a first flow of fluid from a fluid source to the first bladder to expand the first bladder to adjust a position of the first component of the first gas turbine system.

12 Claims, 4 Drawing Sheets

GAS TURBINE ALIGNMENT SYSTEMS AND METHODS

BACKGROUND

The subject matter disclosed herein relates to gas turbine systems, and more particularly to systems and methods for aligning and/or leveling gas turbine system components.

Gas turbines generally include a compressor, a combustor, and a turbine. Each of these components may be coupled to a shaft that will rotate during operation of the gas turbine. The shaft of the turbine may be coupled to a shaft of a load. The load may be any suitable device that may generate power via rotation of the shaft. For example, a gas turbine may be coupled to a generator to generate power for an electrical power grid. In some cases, the gas turbine may be aligned with the generator manually, such as by adjusting fixators that are then cemented into place after alignment has been achieved.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes an alignment system. The alignment system includes a first bladder configured to be positioned under a first component of a first gas turbine system. The alignment system further includes a first valve configured to adjust a first flow of fluid from a fluid source to the first bladder to expand the first bladder to adjust a position of the first component of the first gas turbine system.

In a second embodiment, a system includes a first bladder configured to be positioned under a first component of a first gas turbine system. The system further includes a controller configured to receive a first signal from a first sensor and to generate a first control signal to expand the first bladder to adjust a position of the first component of the first gas turbine system based at a least in part on the first signal generated by the first sensor.

In a third embodiment, a method includes receiving, at a processor, a first signal indicative of an alignment between a first component and a second component of a first gas turbine system. The method further includes providing, via the processor, a first control signal to control a first valve to adjust a flow of fluid to a first bladder positioned under the first component based at least in part on the first signal.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for aligning and/or leveling components of a gas turbine system, such as a turbine and a generator of the gas turbine system. The disclosed embodiments include an alignment system that may help reduce misalignment between the turbine and the generator, thereby enabling an increase in efficiency of the gas turbine system and/or enabling a decrease in wear of components, such as the shafts of the turbine and generator. In certain embodiments, the alignment system may include a number of bladders (e.g., industrial bladders, pneumatic bladders, hydraulic bladders, expandable bags, expandable fluid containers, or flexible containers) coupled to a fluid source and a control system configured to adjust the expansion of the bladders, thereby adjusting the position of the gas turbine system components. In certain embodiments, the control system for the alignment system may include various sensors, and may enable automatic alignment of the components. Further, the alignment system may be removable after alignment, which may enable the alignment system to be reusable and/or to be utilized with a number of gas turbine systems.

Figure 1:
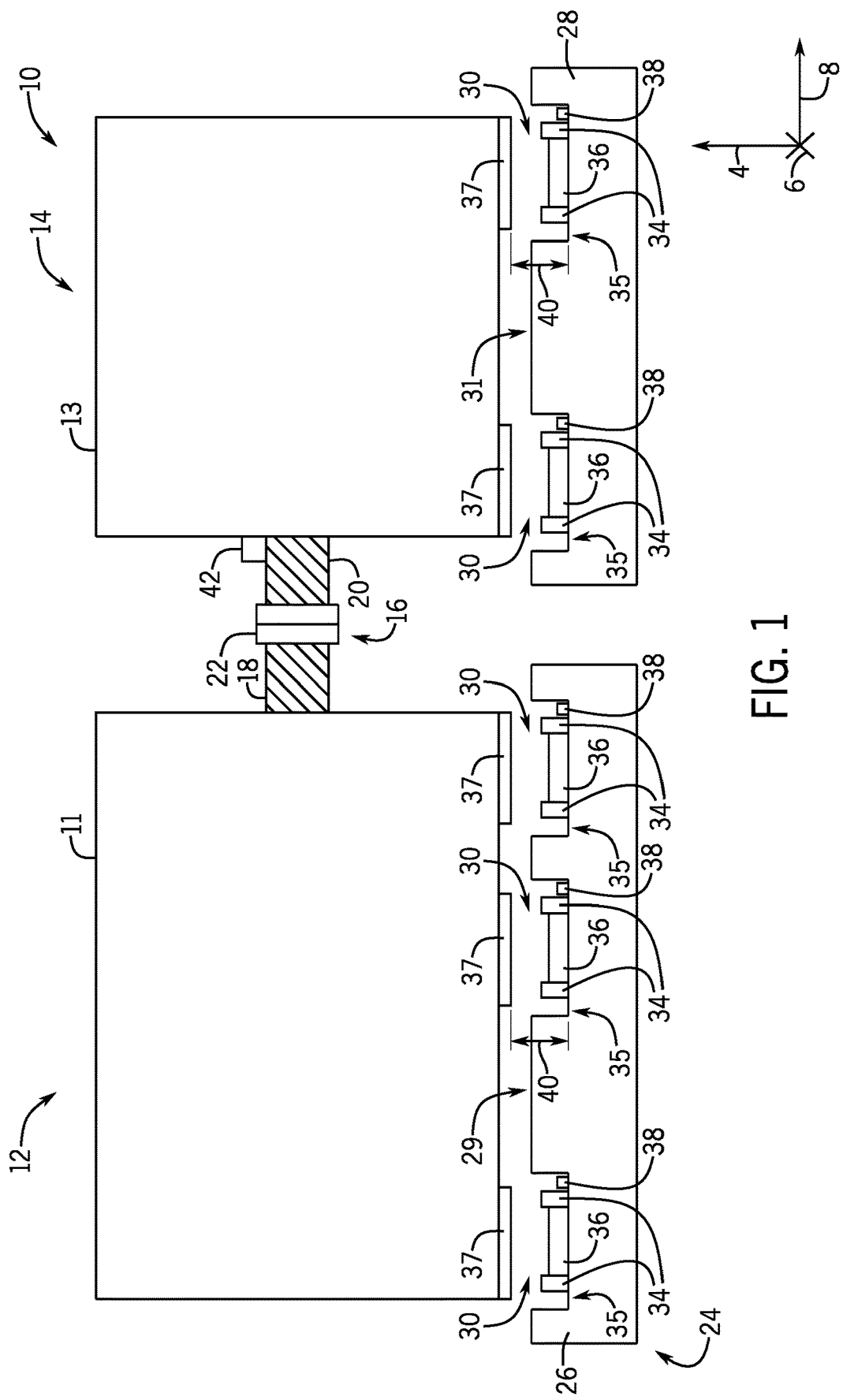
FIG. 1 is a block diagram of an embodiment of a gas turbine system having an alignment system, in accordance with an embodiment of the present disclosure.

Turning now to the drawings, FIG. 1 is a block diagram of an embodiment of a gas turbine system 10 having an alignment system 24 (e.g. pneumatic alignment system). To facilitate discussion, the alignment system 24 and its components may be described with reference to a vertical axis or direction 4, a lateral axis or direction 6, and a longitudinal axis or direction 8. The gas turbine system 10 may include a turbine 12 (e.g. turbine assembly or component) supported within a turbine housing 11 and a load 14 (e.g., load assembly or component) supported within a load housing 13. The load 14 may be any suitable device that may generate power via rotation of a shaft, such as a generator or other external mechanical load. For example, the turbine 12 may be coupled to a generator to generate power for an electrical power grid. In the gas turbine system 10, a compressor may intake air and compress it into pressurized air by rotating blades within the compressor. The pressurized air may be fed into the combustor, where it may mix with fuel delivered by the fuel nozzles creating an air-fuel mixture that may be routed into a combustor. The combustor may ignite and combust the air-fuel mixture, and then pass hot pressurized exhaust gas through turbine blades of a turbine rotor in the turbine 12, thereby driving the shaft 18 of the turbine 12 to rotate. The coupling between blades in the turbine 12 and a turbine shaft 18 may cause the rotation of the turbine shaft 18. The turbine 12 and the load 14 may be coupled through a turbine-load shaft 16. The turbine-load shaft 16 may include the turbine shaft 18 and a load shaft 20 connected through a coupling 22 (e.g., mechanical coupling) at a position between the turbine 12 and the load 14, or at a position within the turbine 12 or the load 14. The rotation of the turbine shaft 18 may then cause rotation of the load shaft 20, thus generating power.

The alignment system 24 may be positioned vertically 4 below the gas turbine system 10 (e.g., during installation, assembly, and/or alignment operations), and may be used to align various components of the gas turbine system 10, such as the turbine 12 and the load 14, and/or the turbine shaft 18 and the load shaft 20. The alignment system 24 may include a turbine foundation 26 positioned vertically 4 below the turbine 12 and a load foundation 28 positioned vertically 4 below the load 14. The turbine foundation 26 may have a number of pockets 30 indented into an upper surface 29 of the turbine foundation 26. There may be any number of pockets 30 (e.g., 4, 5, 6, 7, 8, or more) as desired for alignment of the turbine 12. The pockets 30 may be spaced apart from one another at various distances. Further, in some embodiments, the spaces between particular pockets 30 in the turbine foundation 26 may be equal or unequal. In some embodiments, the pockets 30 may be positioned under the lateral 6 and/or longitudinal 8 edges and/or the corners of the turbine 12. However, in some embodiments, the pockets 30 may be positioned toward the center of the turbine 12. In some embodiments, the pockets 30 in the turbine foundation 26 may have two or more rows (e.g. 3, 4, 5, or more) of pockets 30 that may have pockets 30 spaced apart from one another at the same distances. However, if more than one row of pockets 30 are present, the pockets 30 in each row may be spaced apart from each other at different distances. In the illustrated embodiment, the turbine foundation 26 may have six pockets 30, including three pockets 30 showing and three pockets 30 mirroring the position of the showing pockets on an opposite lateral 6 side of the turbine foundation 26.

Similarly, the load foundation 28 may have a number of pockets 30 indented into an upper surface 31 of the turbine foundation 28. There may be any number of pockets 30 (e.g., 4, 5, 6, 7, 8, or more) as desired for alignment of the load 14. The pockets 30 may be spaced apart from one another at various distances. Further, in some embodiments, the spaces between particular pockets 30 in the load foundation 28 may be equal or unequal. In some embodiments, the pockets 30 may be positioned under the lateral 6 and/or longitudinal 8 edges and/or the corners of the load 14. However, in some embodiments, the pockets 30 may be positioned toward the center of the load 14. In some embodiments, the pockets 30 in the load foundation 28 may have two or more rows (e.g. 3, 4, 5, or more) of pockets 30 that may have pockets 30 spaced apart from one another at the same distances. However, if more than one row of pockets 30 are present, the pockets 30 in each row may be spaced apart from each other at different distances. In the illustrated embodiment, the load foundation 28 may have 4 pockets 30, including two pockets 30 showing and two pockets 30 mirroring the position of the showing pockets on an opposite lateral 6 side of the load foundation 28. The number of pockets 30 in the load foundation 28 may be more than, less than, or equal to the number of pockets 30 in the turbine foundation 26, as desired for alignment of the components.

Within each pocket 30, in the turbine foundation 26 and/or the load foundation 28, the alignment system 24 may include a frame 34 (e.g., a support structure) and one or more bladders 36 (e.g., industrial bladder, pneumatic bladders, hydraulic bladders, expandable bags, expandable fluid containers, or flexible containers). When utilized, the frame 34 may surround and/or support the bladder 36 and may be configured to contact the bladder 36 to facilitate vertical 4 expansion of the bladder 36 and/or to block or to limit lateral 6 and/or longitudinal 8 expansion, in order to adjust the position of the component above. The frame 34 may extend vertically 4 above a floor 35 of the pocket 30, as shown in the illustrated embodiment. However, the frame 34 may be even with the floor 35 of the pocket, such that the bladder 36 is positioned below the floor 35 of the pocket 30. The bladder 36 may be configured to be positioned within the frame 34 in the pockets 30. Any number of bladders 36 (e.g., 2, 3, 4, 5, 6, 7, 8, 9, 10, or more) may be used in the alignment system 24. The number of bladders 36 may be equal to the number of pockets 30 present in both the turbine foundation 26 and the load foundation 28. However, in some embodiments, there may be more than one bladder 36 within any of the pockets 30. In some embodiments, the number of bladders 36 may be less than the number of pockets 30, as one component (e.g., turbine 12) may be moved to a desired position using the bladders 36 and the other component (e.g., generator) may be aligned with the one component using the same bladders 36. The bladders 36 may be configured to expand and/or deflate by receiving a fluid from a fluid source, as discussed in greater detail with reference to FIG. 2. In some embodiments, the expansion of the bladders 36 may cause the bladders 36 to contact plates 37. Plates 37 may be coupled to or positioned on the bottom surface of the turbine 12 and the load 14 at positions vertically 4 over the pockets 30. The plates 37 may be configured to enable the bladders 36 to contact a flat surface to aid in leveling and aligning the turbine 12 and the load 14. It should be understood that the bladders 36 may contact a skid supporting the turbine 12 and/or the load 14 or may directly contact the housing 11 of the turbine 12 and/or the load 14. The contact between the bladders 36 and the plates 37 of the turbine 12 and/or the load 14 may adjust a vertical distance 40 between the floor 35 of the pockets 30 and the plates 37 (or the skid, and/or the housing of the turbine 12 and/or the housing 13 of the load 14). Adjusting the vertical distance 40 at each pocket 30 may enable alignment of the turbine shaft 18 and the load shaft 20.

The vertical distance 40 between the floor 35 of the pocket 30 and the plates 37 may be measured by a position sensor 38. The alignment system 24 may include any number of position sensors 38 (e.g., 1, 2, 3, 4, 5, 6, or more) that may be positioned within the pockets 30. The position sensor 38 may be any type of sensor configured to measure distance or displacement, such as an optical sensor, acoustic sensor, capacitive sensor, magnetic position sensors, or the like. In the illustrated embodiment, the position sensors 38 are positioned in every pocket 30. However, the position sensors 38 may be positioned within any or all of the pockets 30. In some embodiments, the position sensor 38 may be positioned at various locations about the alignment system 24 and/or the gas turbine system 10 that may be suitable for measuring the displacement of the turbine 12 and/or the load 14 via expansion of the bladders 36, such as the vertical distance 40.

Additionally or alternatively, the alignment system 24 may include one or more alignment sensors 42. The alignment sensor 42 may be any type of sensor configured to measure an alignment between the components. For example, the alignment sensor 42 may be one or more lasers that may measure and/or provide an indication of the alignment between the turbine shaft 18 and the load shaft 20. In the illustrated embodiment, the alignment sensor 42 may be positioned on the load shaft 20. However, the alignment sensor 42 may be positioned on the turbine shaft 18, on the load shaft 20, or on both the turbine shaft 18 and the load shaft 20, or at any other location about the alignment system 24 and/or the gas turbine system 10 suitable for measuring the alignment between the turbine 12 and the load 14 at the turbine shaft 18 and the load shaft 20. In some embodiments, the position sensor 38 and/or the alignment sensor 42 may be coupled to a controller configured to control the expansion of the bladders 36 based at least in part on signals received from the sensors 38, 42, as discussed in greater detail with reference to FIG. 3.

In some embodiments, the bladders 36 and/or various other components of the alignment system 24 (e.g., the frames 34, the sensor 38) as a whole may be configured to be removable and/or reusable. In this manner, the bladders 36 may be removed from the pockets 30 once a desired alignment of the turbine shaft 18 and the load shaft 20 has been achieved. In some embodiments, another support, such as a shim, may be positioned in the pockets 30 vertically 4 under the turbine 12 and/or the load 14 to create a footing for the turbine 12 and/or load 14 to remain positioned as aligned by the alignment system 24 after removal of the bladders 36. The removed bladders 36 may subsequently be positioned vertically 4 below and used to align components of a different gas turbine system 10 or to be reused with the same gas turbine system 10 at a later time should re-leveling or re-alignment be desired.

Figure 2:
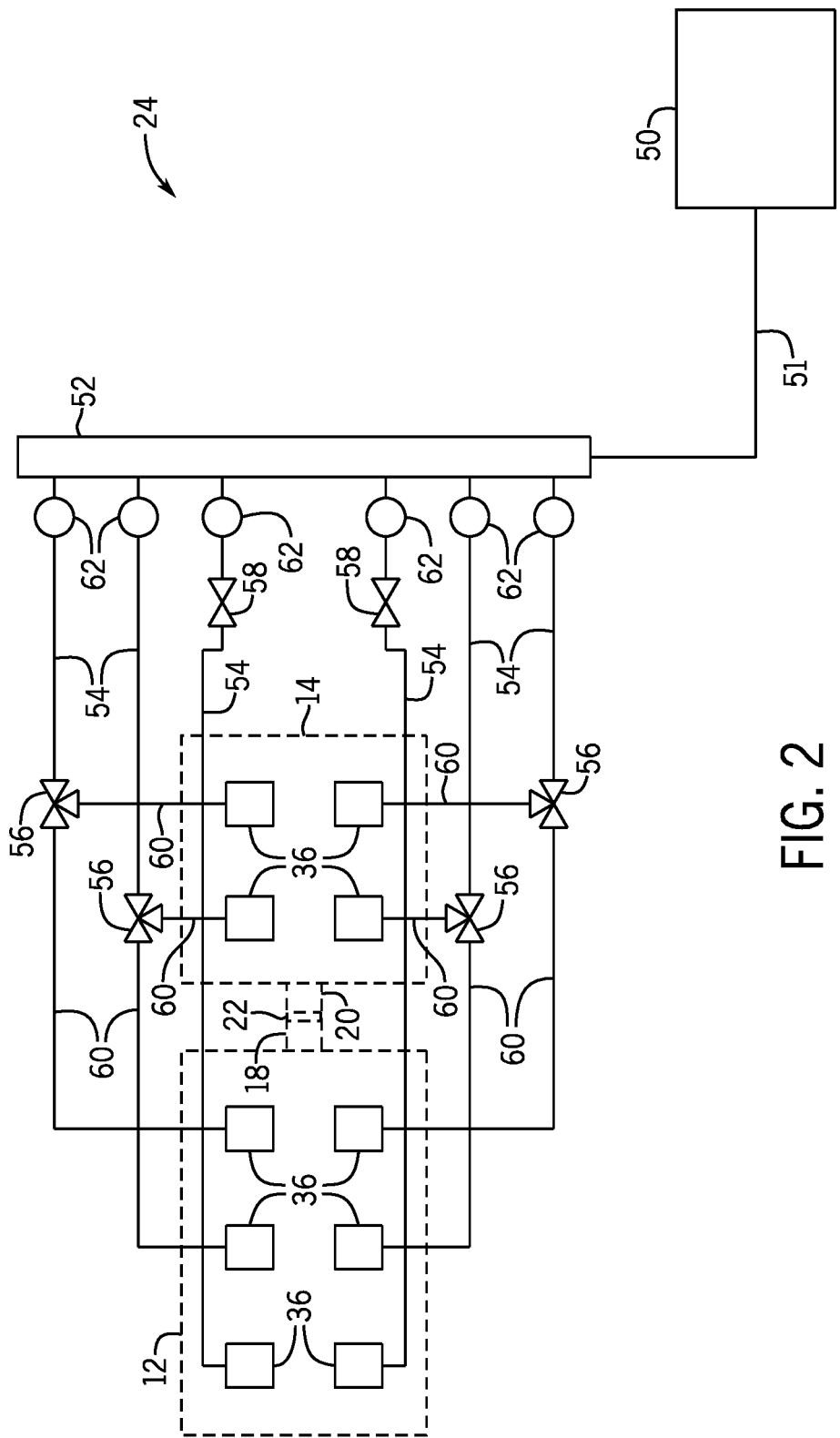
FIG. 2 is a schematic diagram of an embodiment of the alignment system of FIG. 1, in accordance with an embodiment of the present disclosure.
Figure 3:
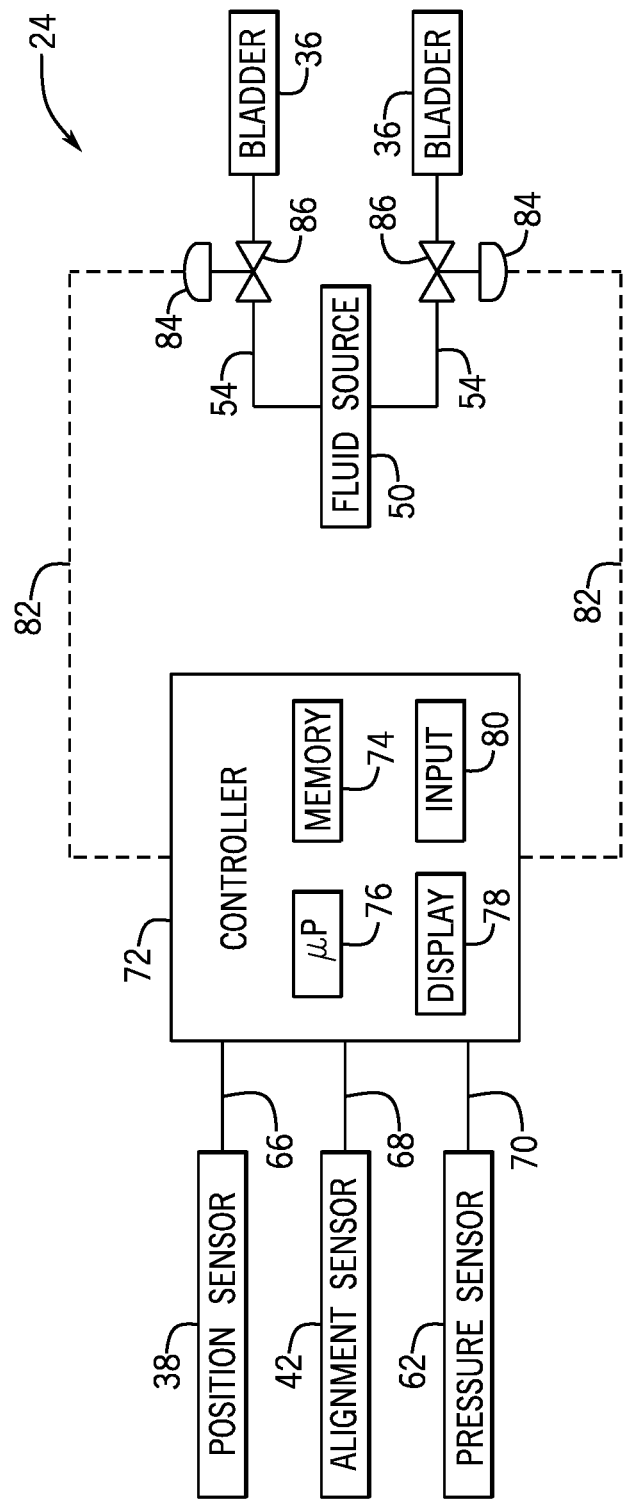
FIG. 3 is a schematic diagram of an embodiment of a control system that may be employed within the alignment system of FIG. 1, in accordance with an embodiment of the present disclosure.

Expansion of the bladders 36 may be adjusted by one or more valves that may be configured to distribute the flow of fluid to the bladder 36 or to a set of bladders 36 individually or in concert. FIG. 2 illustrates an embodiment of the fluid flow and valve arrangement of the alignment system 24, while FIG. 3 illustrates control of the valves via a controller to control expansion of the bladders 36 of the alignment system 24.

FIG. 2 is a schematic diagram of an embodiment of the alignment system 24 of FIG. 1. In particular, FIG. 2 shows the flow of fluid from a fluid source 50 (e.g., pneumatic fluid source or hydraulic fluid source) that may cause expansion of the bladders 36. The fluid supplied by the fluid source 50 may be any fluid configured to expand the bladders 36, such as air, a gas, or a hydraulic fluid. The fluid source 50 may provide a flow of fluid along a fluid line 51. In some embodiments, the fluid line 51 may direct the fluid into a manifold 52 (e.g., a pressure regulating manifold). The manifold 52 may be coupled to one or more bladder lines 54 and may be configured to aid in even distribution of the fluid flow from the fluid source 50 to the bladder lines. 54. The manifold 52 may be configured to regulate the pressure of the fluid flowing into the bladder lines 54. The bladder lines 54 may direct the flow of fluid from the manifold 52 to the bladders 36. There may be any number (e.g. 2, 3, 4, 5, 6, or more) of bladder lines 54 coupled to the manifold 52. The bladder lines 54 may each be coupled to one or more bladders 36 of the alignment system 24 either directly or through branch bladder lines 60 that may branch from valves 56 along the bladder lines 54. Each of the bladder lines 54 and/or branch bladder lines 60 may direct the fluid to the bladders 36 under only the turbine 12, under only the load 14, and/or a combination of bladders 36 under both the turbine 12 and the load 14.

Each bladder line 54 may include one or more valves configured to adjust the flow of fluid along each respective bladder line 54. In the illustrated embodiment, the valves include three-way valves 56 and two-way valves 58. The three-way valves 56 may be used to direct fluid from a bladder line 54 to more than one bladder 36. In the illustrated embodiment, there are six bladder lines 54. As shown, four of the bladder lines 54 are each configured to direct the flow of fluid two bladders 36. Along each of these bladder lines 54 there is a three-way valve 56. From the three-way valves 56, the bladder lines 54 split into two branch bladder lines 60 that direct the flow of fluid from the three-way valve 56 to each respective bladder 36. The three-way valve 56 may enable sequential or simultaneous control of the expansion of more than one bladder 36 at a time to adjust the alignment of the turbine 12, the load 14, or both the turbine 12 and the load 14 together. The three-way valve 56 may further enable a reduction in the amount of parts included in the alignment system 24. In the illustrated embodiment, two of the bladder lines 54 each include a two-way valve 58 and are coupled to one respective bladder 36. As shown, the bladder lines 54 direct the flow of fluid directly to each respective bladder 36 by way of the two-way valve 58. The two-way valve 58 may enable individual control of the expansion of each respective bladder 36. The alignment system 24 may include one or more two-way valves 58, one or more three-way valves 56, a combination of two-way valves 58 and three-way valves 56, or any other types of valves configured to adjust the flow of fluid to the one or more bladders 36 of the alignment system 24.

In some embodiments, the alignment system 24 may include one or more pressure sensors 62 (e.g. pressure transducers) along the bladder lines 54 and/or the branch bladder lines 60. Therefore, the alignment system 24 may include any number (e.g., 1, 2, 3, 4, 5, 6, 7, 8, or more) of pressure sensors 62. The pressure sensor 62 may be configured to determine a pressure of the flow of fluid directed to each respective bladder 36. As in the illustrated embodiment, the pressure sensors 62 may be positioned along the bladder lines 54 adjacent to the manifold 52. However, the pressure sensors 62 may be positioned at any location along the bladder lines 54. Additionally or alternatively, the pressure sensors 62 may be positioned along the branch bladder lines 60 adjacent to the three-way valves 56, or at any other position along the branch bladder lines 60, thus monitoring and/or providing an indication of the pressure of the fluid flowing to each individual bladder 36. In this manner, a single pressure sensor 62 may monitor the pressure of the fluid flow to a group of bladders 36 and/or the pressure to an individual bladder 36. The pressure sensors 62 may enable the controller and/or an operator to receive an indication that the respective bladder 36 is being expanded and by how much. The pressure sensor 62 may further enable the controller and/or the operator to receive an indication that the respective bladder 36 or other components of the alignment system 24 may or may not be functioning in an expected manner (e.g., if the pressure readings do not indicate an increase in pressure upon supply of fluid to the bladder 36, the bladder 36 may have a leak).

FIG. 3 is a schematic diagram of an embodiment of a control system that may be employed within the alignment system 24 of FIG. 1. A controller 72 (e.g., electronic controller) of the alignment system 24 may be configured to receive input from one or more sensors, including the position sensor 38, the alignment sensor 42, and/or the pressure sensor 62. In some embodiments, there may be one or more positions sensors 38 that may be positioned within any or all of the pockets 30, as previously discussed. The position sensors 38 may be configured to monitor the vertical distance 40 between the floor 35 of the pockets 30 and the plates 37 on the bottom of the turbine 12 and/or load 14, the skid of the turbine 12 and/or load 14, or the housing of the turbine 12 and/or the load 14 for example. The position sensors 38 may further be configured to send one or more signals 66 to the controller 72 indicative of the distance or distances between the floor 35 of the pockets 30 and the plates 37, skids, and/or housing of the turbine 12 and/or load 14. In some embodiments, there may be one or more alignment sensors 42 that may be positioned on or adjacent to the turbine shaft 18, the load shaft 20, or both the turbine shaft 18 and the load shaft 20, as previously discussed. The alignment sensor 42 may be configured to monitor the alignment between the turbine 12 and the load 14 and/or the alignment between the turbine shaft 18 and the load shaft 20. The alignment sensor 42 may further be configured to send one or more signals 68 to the controller 72 indicative of the alignment or alignments. In some embodiments, there may be one or more pressure sensors 62 along the one or more bladder lines 54 and/or the one or more branch bladder lines 60, as discussed previously. The pressure sensors 62 may be configured to monitor the pressure of the fluid in the bladder lines 54 and/or the branch bladder lines 60 directed to each respective bladder 36 and/or a ground of bladders 36. The pressure sensors 62 may further be configured to send one or more signals 70 to the controller indicative of the pressures directed to the respective bladders 36.

The controller 72 may be configured to be positioned proximate to or remote from the gas turbine system 10 and may be configured to receive signals 66, 68, and/or 70 from the position sensor 38, the alignment sensor 42, and/or the pressure sensor 62. The controller 72 may include a memory 74, a processor 76, a display 78, and/or an input 80. In operation, the controller 72 may receive the signals 66, 68, and/or 70 at the processor 76. In some embodiments, these signals and/or any control signals sent by the controller 72 may be saved in the memory 74. In some embodiments, indications of the input signals and/or the control signals may be displayed to an operator via the display 78. In some embodiments, the input 80 may be used by an operator to provide instructions to the controller 72 to control the expansion and/or deflation of the bladders 36. In some embodiments, the controller 72 may determine and send one or more control signals 82 configured to control one or more valves 86 (e.g., three-way valves 56 and/or two-way valves 58) via the processor 76. The control signals 82 may be configured to control an actuator 84 to open and/or close the valves 86. The actuator 84 may receive the control signals 82 sent by the controller 72 and may actuate (i.e., move) to open or close the valves 86. The opening and/or closing of the valves 86 may control the flow of fluid to the bladders 36 from the fluid source 50, thereby controlling the expansion of the bladders 36. By controlling the expansion of the bladders 36, the controller 72 may control the alignment of the turbine shaft 18 and the load shaft 20, and/or the alignment of the turbine 12 and the load 14.

Figure 4:
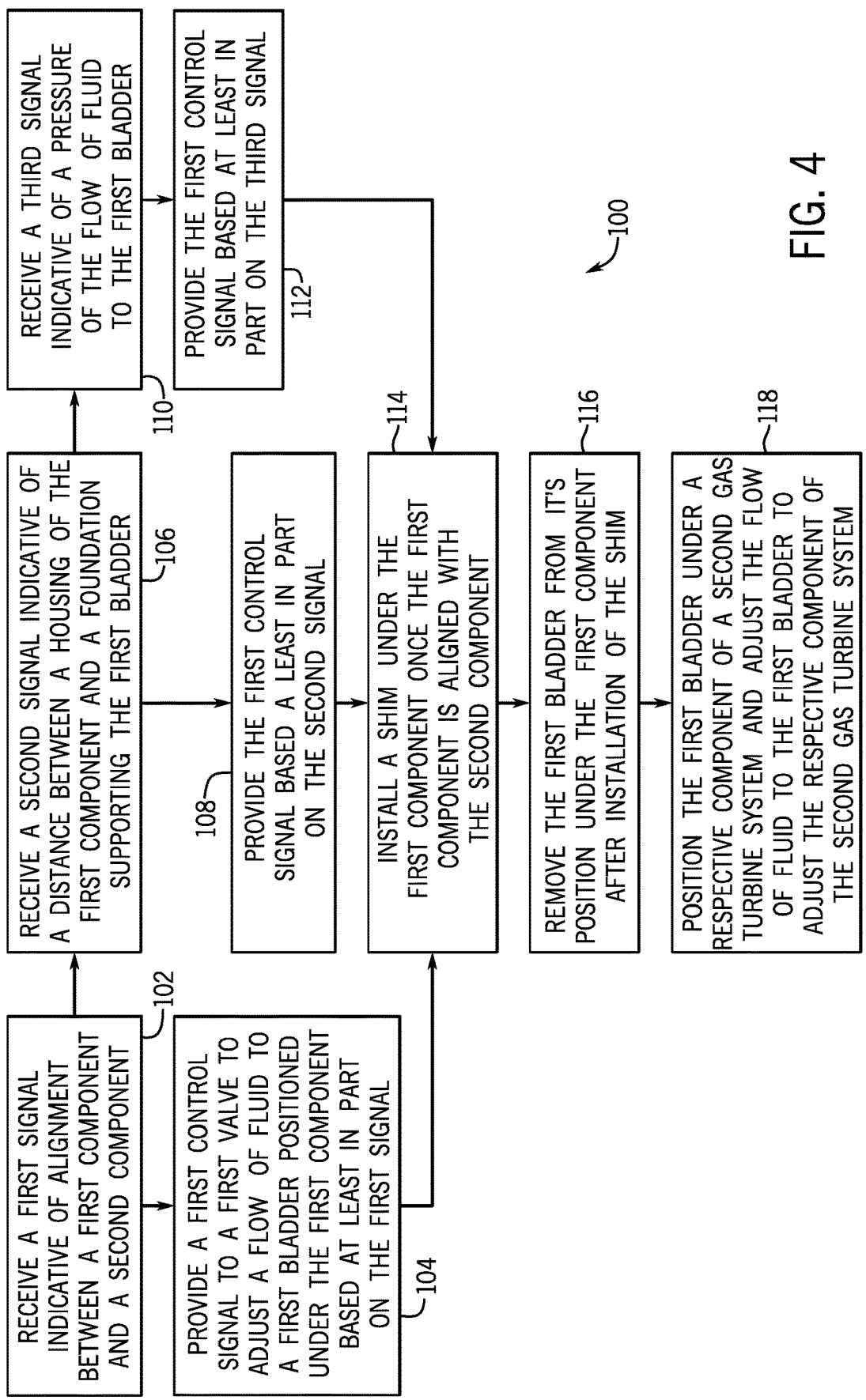
FIG. 4 is a flow diagram of an embodiment of a method for aligning components of the gas turbine system of FIG. 1, in accordance with an embodiment of the present disclosure.

FIG. 4 is a flow diagram of an embodiment of a method 100 for aligning components of the gas turbine system 10 of FIG. 1, such as the turbine 12 and the load 14 and/or the turbine shaft 18 and the load shaft 20. In some embodiments, the method 100 may include receiving a signal at the processor 76 of the controller 72 indicative of an alignment between one component of a gas turbine system 10, such as the turbine 12, and another component of the gas turbine system 10, such as the load 14 (block 102). The signal indicative of the alignment may be received by the processor 76 from the one or more alignment sensors 42. The method 100 may further include, providing, via the processor 76, a control signal to a valve 86 to adjust a flow of fluid to a bladder 36 that may be positioned under one of the components based at least in part on the signal indicative of the alignment. In some embodiments, the method 100 may include receiving, at the processor, another signal indicative of a distance (e.g., the vertical distance 40) between a housing of the component and a foundation (e.g., turbine foundation 26 and/or load foundation 28) supporting the bladder 36 (block 106). The signal indicative of the distance may be received by the processor 76 from the one or more position sensors 38. The processor 76 may provide the control signal to the valve 86 to adjust the flow of fluid to the bladder 36 based at least in part on the signal indicative of the distance between the housing of the component and the foundation supporting the bladder (block 108). Further, in some embodiments, the method 100 may include receiving, at the processor 76, another signal indicative of a pressure of the flow of fluid to the bladder 36 (block 110). The signal indicative of the pressure may be received by the processor 76 from the one or more pressure sensors 62. The processor 76 may provide the control signal to the valve to adjust the flow of fluid to the bladder 36 based at least in part on the signal indicative of the pressure of the flow of fluid to the bladder 36 (block 112).

In some embodiments, the method 100 may further include installing a shim under the component once the component is aligned with the other component (block 114). The processor 76 may determine that the turbine 12 and the load 14 and/or the turbine shaft 18 and the load shaft 20 are aligned based on signals received from the alignment sensor 42, the position sensor 38, and/or the pressure sensor 42. The processor 76 may determine that the turbine 12 and the load 14 are aligned when the turbine 12 and/or the load 14 are level relative to the foundation 26, 28 and/or when the vertical distance 40 monitored by various position sensors 38 about the turbine 12 and/or the load 14 are substantially similar (e.g., equal to or less than 0.5, 1, 2, 3, 4, 5, or 10 percent variation) or a desired vertical distance 40 above the foundation 26, 28 is achieved. Additionally or alternatively, the processor 76 may determine that the turbine shaft 18 and the load shaft 20 are aligned when the signal from the alignment sensor 42 indicates that the turbine shaft 18 and the load shaft 20 are aligned along a common central longitudinal axis 8, for example. The processor 76 may control the fluid flow (e.g., increasing and/or decreasing) until such alignment and/or leveling is achieved.

Some or all of the alignment system 24, including the bladders 36, the position sensor 38, the alignment sensor 42, and/or the pressure sensor 62, may be configured to be removable once alignment has been achieved and reusable to align other gas turbine systems. Therefore, in some embodiments, the method 100 may include removing the bladder 36 from its position under the component after installation of the shim (block 116). In some embodiments, the bladder 36 may be positioned under a respective component of a different gas turbine system and the flow of fluid to the bladder may be adjusted to the respective component of the different gas turbine system (block 118), as set forth via blocks 102-116 for example.

Technical effects of the disclosed embodiments include facilitating alignment and/or leveling of components, such as the turbine and the generator, of a gas turbine system, thus enabling more accurate alignment between the gas turbine system components. More accurate alignment between the components of the gas turbine may enable a reduction in wear of the components during operation. The alignment system may be controlled through a controller and/or various sensors, which may enable more efficient and/or more accurate automatic alignment without manual operator adjustment. The flow of fluid to the bladders from the fluid source may be controlled such that the bladders may be expanded individually, in groups, or all together simultaneously, which may further enable more efficient and/or more accurate alignment of the gas turbine system components. The alignment system may include various sensors, such as the alignment sensor that may determine an alignment of the components of the gas turbine system, which may further enable more efficient and/or more accurate alignment. Further, the alignment system, including the bladders, the controller, and/or the sensors may be removable once a desired alignment has been achieved and may be reusable under other gas turbine systems for alignment and/or leveling. In this manner, the alignment system may enable a cost savings because, unlike other alignment mechanisms, the bladders may not be cemented in place once alignment under one gas turbine system is achieved, and a single alignment system may be used for alignment of many gas turbine systems.

This written description uses examples to disclose the concepts discussed herein, including the best mode, and also sufficient disclosure to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   an alignment system, comprising:
   a first bladder configured to be positioned under a first component of a first gas turbine system;
   a first valve configured to adjust a first flow of fluid from a fluid source to the first bladder to expand the first bladder to adjust a position of the first component of the first gas turbine system;
   a sensor system configured to generate a signal, wherein the sensor system comprises an alignment sensor, and the alignment sensor is configured to emit an alignment signal indicative of an alignment between a shaft of the first component and a second component, wherein the first gas turbine system comprises the second component; and
   a controller, comprising a processor, configured to receive the signal from the sensor system, and in response to the signal, the controller controls the first valve to control inflation of the first bladder to adjust a first vertical lift under the first component to align the position of the first component of the first gas turbine system with the second component, wherein the controller is configured to control the first valve to adjust the position of the first component until the alignment signal indicates that the shaft of the first component and the second component are aligned with one another.

2. The system of claim 1, wherein the sensor system further comprises a position sensor.

3. The system of claim 1, wherein the sensor system further comprises a position sensor, and the position sensor is configured to emit a position signal indicative of a distance between a housing of the first component and a foundation supporting the first bladder.

4. The system of claim 1, wherein the alignment system comprises a second bladder configured to be positioned under the second component of the first gas turbine system, and a second valve configured to adjust a second flow of fluid from the fluid source to the second bladder to expand the second bladder to adjust a respective position of the second component of the first gas turbine system, wherein the controller controls the second valve to control inflation of the second bladder to adjust a second vertical lift under the second component to align the respective position of the second component with the first component.

5. The system of claim 1, wherein the first bladder is reusable and is configured to be positioned under a component of a second gas turbine system.

6. The system of claim 1, comprising the first component, wherein the first component comprises a turbine or a generator.

7. A system, comprising:
   a first bladder configured to be positioned under a first component of a first gas turbine system;
   a first valve configured to adjust a first flow of fluid from a fluid source to the first bladder to expand the first bladder to adjust a position of the first component of the first gas turbine system;
   a sensor system configured to generate a first signal, wherein the sensor system comprises an alignment sensor, and the alignment sensor is configured to emit an alignment signal indicative of an alignment between a shaft of the first component and a second component, wherein the first gas turbine system comprises the second component; and
   a controller, comprising a processor, configured to receive the first signal from the sensor system and, in response to the first signal, the controller controls the first valve to control inflation of the first bladder to adjust a first vertical lift under the first component to align the first component of the first gas turbine system with the second component, wherein the controller is configured to control the first valve to adjust the position of the first component until the alignment signal indicates that the shaft of the first component and the second component are aligned with one another.

8. The system of claim 7, wherein the sensor system further comprises a position sensor.

9. The system of claim 7, wherein the controller is configured to receive a second signal from the sensor system and to control inflation of the first bladder based at least in part on the second signal generated by the sensor system.

10. The system of claim 7, comprising a second bladder configured to be positioned under the second component of the first gas turbine system, wherein the controller is configured to control inflation of the second bladder to adjust a second vertical lift under the second component to adjust a position of the second component of the first gas turbine system based at least in part on a second signal generated by the sensor system.

11. The system of claim 7, wherein the first bladder is reusable and is configured to be positioned under a respective component of a second gas turbine system.

12. The system of claim 1, wherein the alignment system comprises a second bladder, and the controller is configured to control inflation of the second bladder independent from the first bladder to adjust a second vertical lift under the first or second component to help align the first and second components.

* * * * *